United States Patent [19]

Briatte

[11] Patent Number: 5,119,090
[45] Date of Patent: Jun. 2, 1992

[54] AERONAUTICAL OPTICAL GUIDANCE SYSTEM

[75] Inventor: Louis M. Briatte, Paris, France

[73] Assignee: Britec, France

[21] Appl. No.: 595,749

[22] Filed: Oct. 3, 1990

Related U.S. Application Data

[63] Continuation of Ser. No. 359,688, May 31, 1989, abandoned.

[30] Foreign Application Priority Data

May 31, 1988 [FR] France .................. 88 07248

[51] Int. Cl.⁵ .................................................. B64F 1/20
[52] U.S. Cl. ........................................ 340/954; 340/953;
340/947; 342/33; 364/428
[58] Field of Search ................ 340/947, 948, 952–956;
73/178 T; 342/33; 244/114 R; 362/62;
364/428, 443

[56] References Cited

U.S. PATENT DOCUMENTS

| 1,963,508 | 6/1934 | Stilwell, Jr. | |
| 2,441,877 | 5/1948 | Flett | 340/955 |
| 2,784,925 | 3/1957 | Goodhart | 340/955 |
| 2,968,023 | 1/1961 | Ferguson et al. | 340/955 |
| 3,138,779 | 6/1964 | Murray, Jr. et al. | 340/955 |
| 3,279,406 | 10/1966 | Ricketts et al. | 340/955 |
| 3,305,826 | 2/1967 | Kaplan | 340/954 |
| 3,447,129 | 5/1969 | Birmingham et al. | 340/956 |
| 3,885,876 | 5/1975 | Konopka | 340/955 |
| 4,170,767 | 10/1979 | Tanner | 340/955 |
| 4,318,076 | 3/1982 | Whitfield | 340/949 |
| 4,554,544 | 11/1985 | Task | 340/947 |
| 4,667,196 | 5/1987 | Kaul | 340/948 |
| 4,707,696 | 11/1987 | Task et al. | 340/947 |

FOREIGN PATENT DOCUMENTS 1564107 4/1969 France .
2434081 3/1980 France .

Primary Examiner—Jin F. Ng
Assistant Examiner—Brent A. Swarthout
Attorney, Agent, or Firm—Oliff & Berridge

[57] ABSTRACT

Optical guidance system for the night landing of aircraft on a landing area along a determined approach path, which comprises two horizon reference luminous bars (1, 2) disposed in alignment with each other in a horizontal direction substantially perpendicular to the approach path, and two azimuth overshoot indicating lamps, respectively to the left (5) and to the right (6), located at the outer ends of the pair of horizon reference bars and provided with masks (8) in order that they can only be seen by the aircraft if the latter overshoots the approach path in azimuth to the left and to the right respectively.

6 Claims, 5 Drawing Sheets

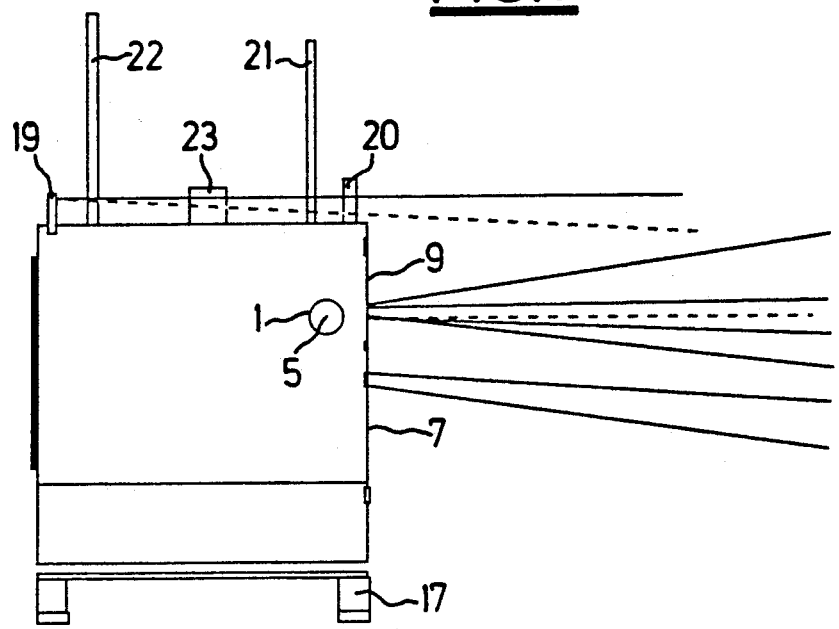
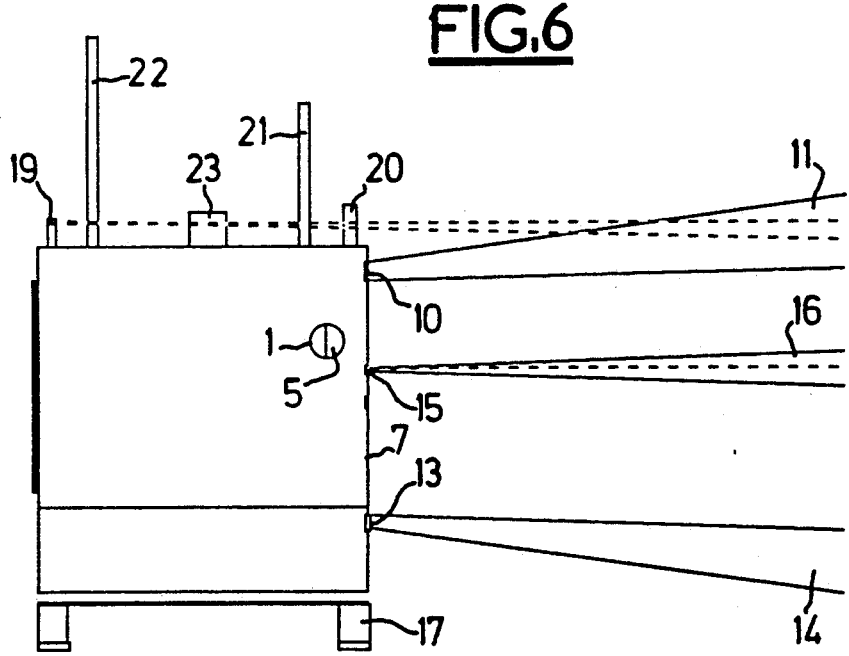

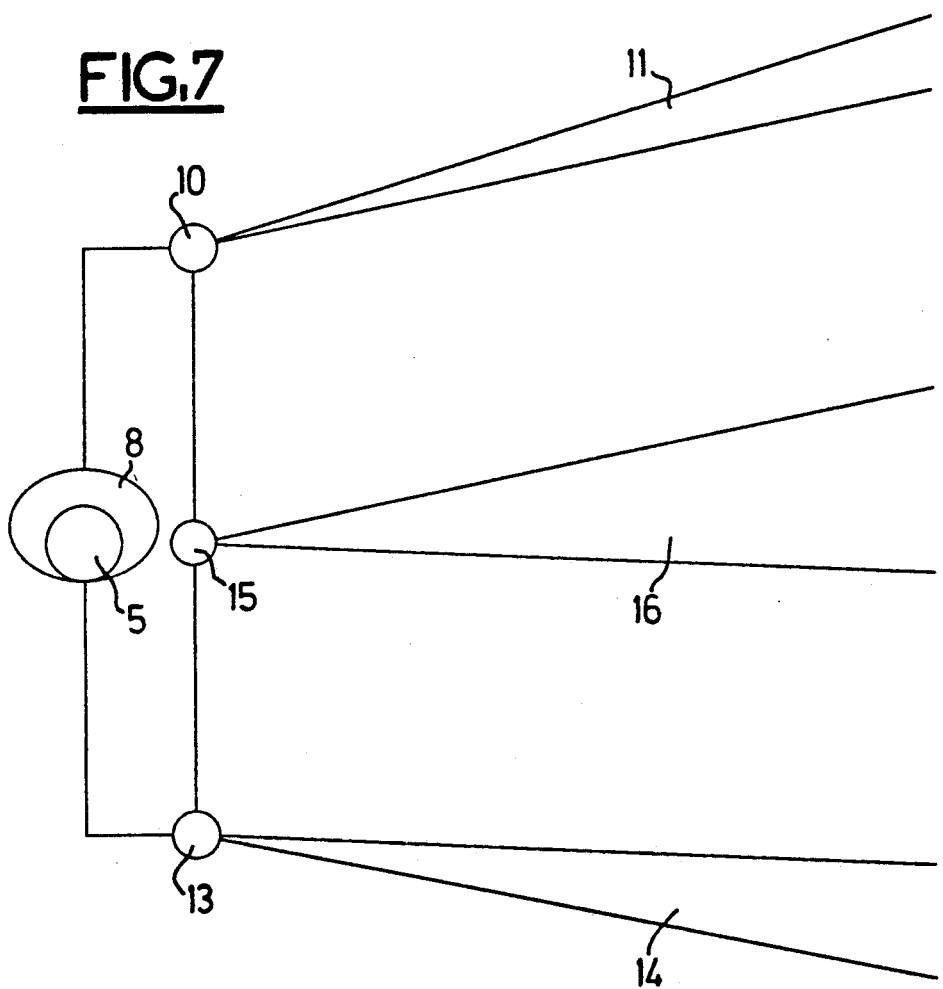

AERONAUTICAL OPTICAL GUIDANCE SYSTEM

This is a continuation of application Ser. No. 07/359,688 filed May 31, 1989 and now abandoned.

FIELD OF THE INVENTION

The invention relates to the optical guidance of aircraft of all types in order to enable them to land at night.

BACKGROUND OF THE INVENTION

There are already known optical devices using colored beams enabling an aircraft in the approach phase to locate itself with respect to the approach plan, i.e. to determine if it is in the correct position, or too high, or too low, with respect to this approach plan, but these devices give information only on the positioning in elevation and do not provide any horizon reference nor azimuth reference, these latter necessitating recourse to other methods.

Furthermore, for military applications, these optical guidance devices have the obvious disadvantage of facilitating spotting by the enemy.

SUMMARY OF THE INVENTION

The object of the invention is to eliminate the above disadvantages by producing an aeronautical optical guidance system which can operate with visible or infrared light, which enables the pilot to be given an optical horizon reference, and which furthermore provides a guidance, also by optical means, at least in azimuth, on the correct approach path.

In order to do this, the invention combines a minimum of two horizon reference light bars in alignment with each other with a certain gap between them along a horizontal line substantially perpendicular to the approach path, and two lights indicating azimuth overshoot, respectively to the right and to the left, located at the outer ends of the horizon reference light bars, and provided with masks adjusted so that they are only visible from outside of the approach path, each on the corresponding side.

This system can furthermore possibly be completed by lights indicating overshoot in elevation upwards and downwards, constituted by directive beams adjusted so that they can respectively be seen only from above and from below the correct approach plan.

The horizon reference light bars can emit a visible, non-dazzling, white or colored light, or an infrared light. The same applies to the left and right azimuth overshoot indicating lights, the latter preferably being flashing lights in order to draw the attention of the pilot to a greater degree.

Finally, the upward and downward elevation overshoot indicating lights can also emit a visible or infrared light, and can be distinguished from each other by their color if they are in visible light and/or by their quantity and position, particularly if they are infrared lights, and they can advantageously be flashing, in order to draw attention, with equal or different flashing rates, and flashing in phase or alternately.

In this way, a simple optical observation, direct if it is in visible light or by means of a night vision device it if is in infrared light, enables the pilot to be informed of the horizon reference and of his location in azimuth and in elevation in order to guide him precisely on the approach path to the landing area.

The system can furthermore be combined with a device for remote control from the aircraft or with a device for remote transmission to the aircraft.

BRIEF DESCRIPTION OF THE DRAWINGS

Other features of the invention will appear in the following description of one embodiment taken as an example and shown in the accompanying drawing in which:

FIG. 5 is a side view of the device when operating with visible light;
FIG. 6 is a view corresponding to FIG. 5 when operating with infrared light;
FIG. 7 is a diagrammatic side elevation of this infrared operation.

DETAILED DESCRIPTION OF THE PREFERRED EMBODIMENTS

Figure 1:
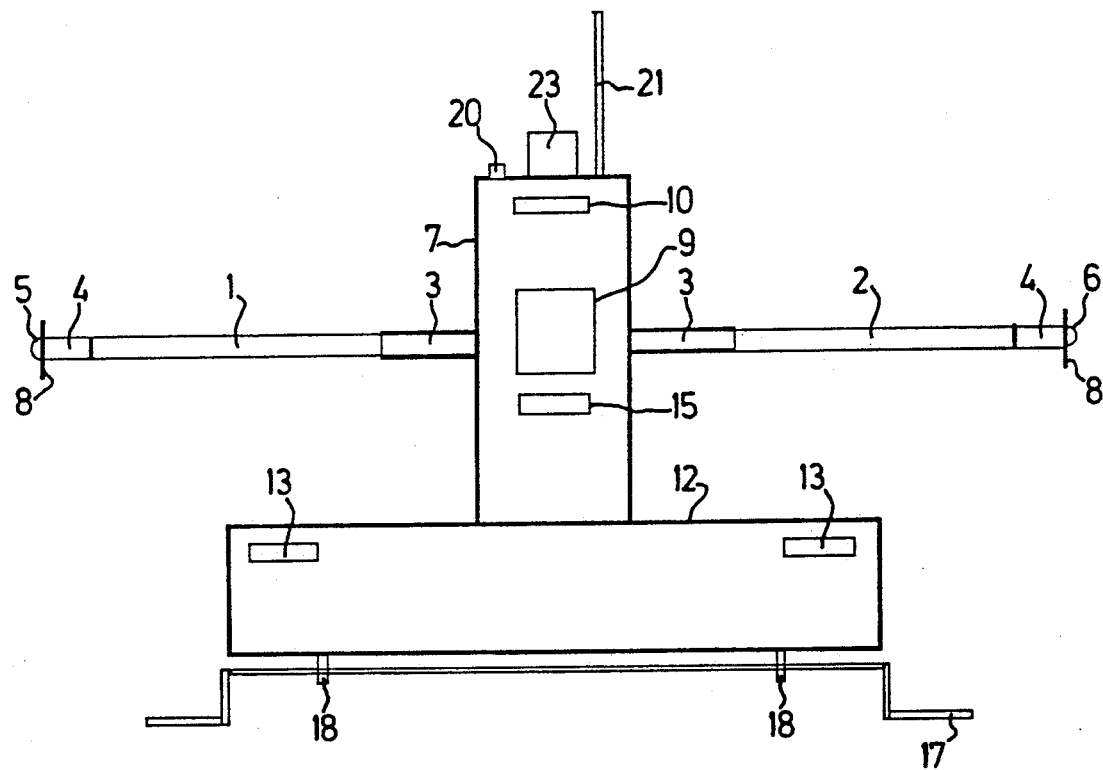
FIG. 1 is a front elevation of the complete system.
Figure 2:
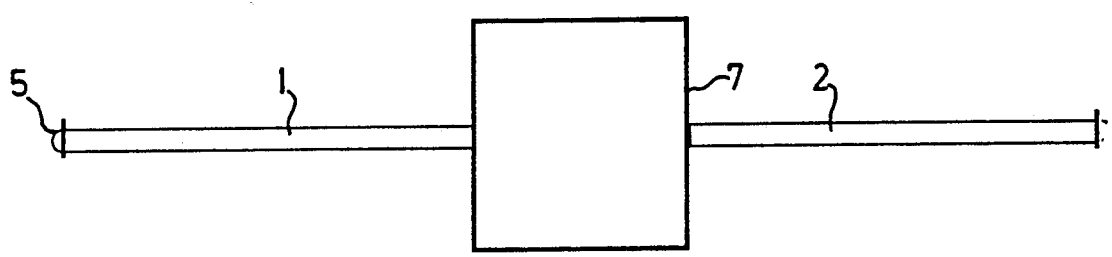
FIG. 2 is a simplified plan view.

The guidance system according to the invention essentially comprise two horizon reference bars 1 and 2 in alignment with each other along a horizontal line substantially perpendicular to the approach path. Each of these bars includes a main luminous zone and dark end zones, 3 at the centre and 4 at the outer ends of the system.

The system furthermore comprises two azimuth overshoot indicating lights, one of which 5 is to the left and at the end of the bar 1 and the other 6 is to the right at the end of the bar 2.

These bars 1 and 2 and these lights 5 and 6 can emit in visible, white or colored light or in infrared light. Furthermore, the end lights 5 and 6 are preferably flashing lights.

In this way, in the darkness, the pilot perceives either directly or by means of an infrared visor, the two luminous bars 1 and 2 distinctly separated because of masked sections 3 and central cabinet 7 of the device, and end lights 5 and 6 also appear separately because of masked sections 4 and the flashing of these lights.

Figure 3:
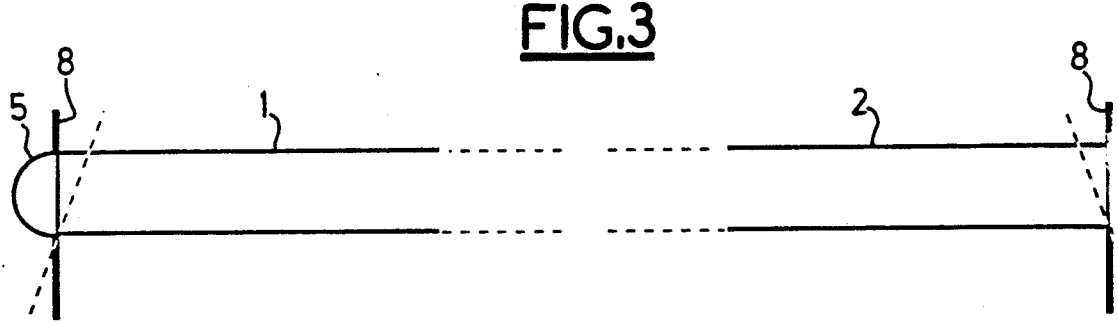
FIG. 3 shows the ends of FIG. 2 at a larger scale.
Figure 4:
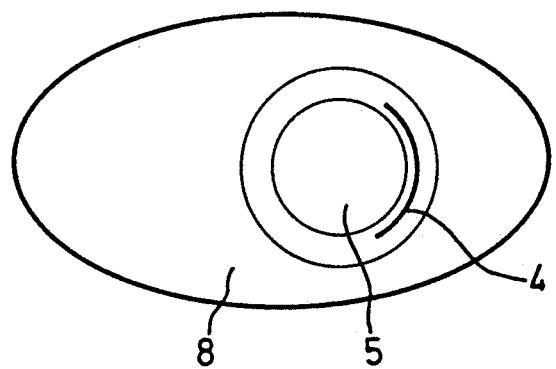
FIG. 4 is an end view at an even larger scale in the direction IV shown in FIG. 3.

However, as shown in particular in FIGS. 3 and 4, adjustable masks 8 are adjusted in such a way that neither one nor the other of the end lights 5 and 6 is visible when the pilot is located on the azimuth of the approach path, while on the other hand, as soon as he moves out of this path on the right-hand side he notices right-hand azimuth overshooting indicating lamp 6 in the form of a flashing light and, conversely, if he overshoots his path on the left-hand side he notices left overshoot indicating lamp 5 in its flashing form to the left of the set of two bars 1 and 2. The two lights 5 and 6 are therefore never seen at the same time.

A pilot starting his turn to enter the approach phase therefore has both an accurate horizon reference, dispensing him from having to use his on-board artificial horizon, and at the same time an accurate guidance in azimuth by each appearance of a flashing light to the right or to the left of the horizon reference bars.

The system can naturally be completed by an optical guidance system in elevation using colored beams of known type, at least if the system is working with visible light.

In a more general way, the system according to the invention can advantageously be completed by lights indicating upward and downward elevation overshoot constituted by directional beams of visible or infrared light.

In the device used as an example, the two possibilities, visible or infrared light, are grouped in the same system in order that either can be used at will, but naturally never both at the same time.

In FIG. 1 window 9 can be seen located between the two horizon reference bars 1 and 2 and through which the colored beams, which can be seen in FIG. 5, are transmitted and enabling, in a known way, the elevation of the aircraft to be referenced with respect to the approach plan. The corresponding colored signal, flashing or otherwise, therefore appears at night approximately midway between bars 1 and 2, which enables the optical source on the ground corresponding to the elevation guidance to be located and identified.

On the other hand, in the case of infrared guidance, the beams cannot be distinguished by their color and they are therefore distinguished by their position in relation to bars 1 and 2. For example, window 10, located distinctly above the level of bars 1 and 2, enables the sending of infrared beam 11, shown in FIGS. 6 and 7, this beam, preferably flashing signalling the upward overshooting of the ideal elevation.

Also, in base cabinet 12, onto which central cabinet 7 is fixed, there are provided, for example, two windows 13 through which two infrared beams 14 are transmitted which are visible distinctly below the level of bars 1 and 2 when the aircraft is below the approach plan. These beams 14 are also flashing, and preferably alternated between right and left for the two windows 13.

Finally, there can advantageously be provided a last window 15, substantially at the level of bars 1 and 2 and possibly merged with window 9 for the transmission of infrared beam 16 which is not flashing, indicating a correct approach in elevation.

Naturally, this distinction of the lamps and their function by their position, their number, and their flashing could equally well be used with visible light instead of or in addition to their color.

Figure 8:
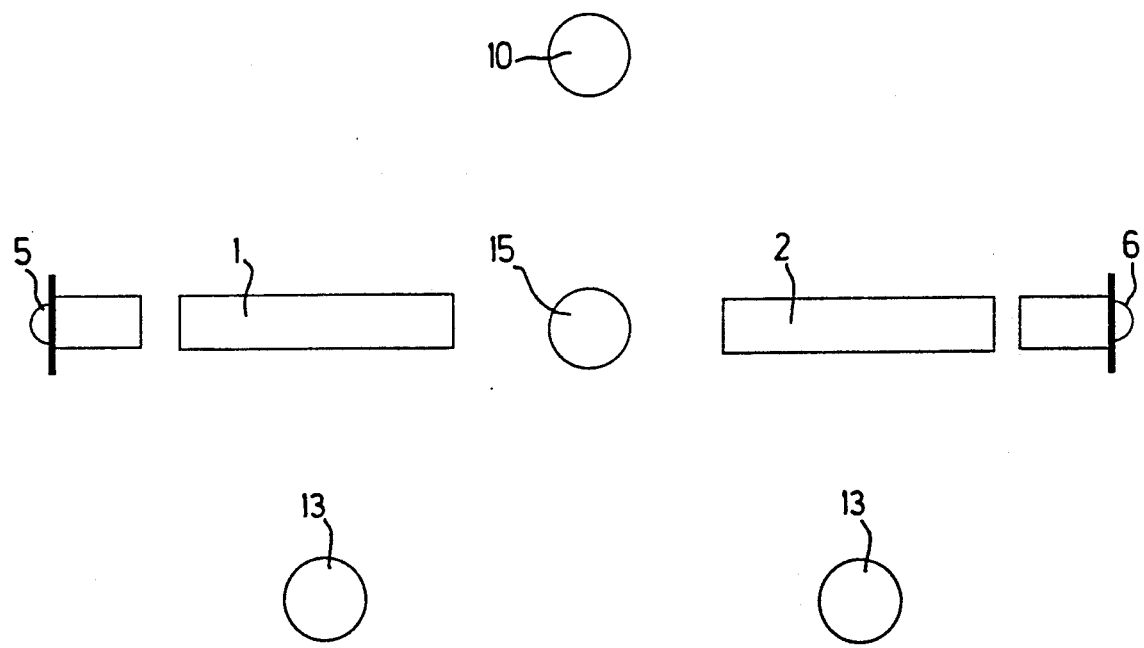
FIG. 8 is a diagrammatic front view of the parts visible by the pilot.

FIG. 8 summarizes the nocturnal appearance of the various visible sections, it being understood that, as explained above, they are not all visible at the same time.

Naturally, any system of visible and infrared beams is accurately adjusted, and this system is fixed on the ground by fixing plate 17 with elevation adjustment jacks 18, alidade 19-20 also being provided, for example on the top of central cabinet 7, to enable this elevation adjustment, and also the azimuth adjustment by rotation of the system on the ground. The fixing system can also be gyroscopically stabilized for marine applications.

As a refinement, the functioning of the system can be brought into operation automatically by remote control from the aircraft using a coded transmission by providing receiving antenna 21 on the cabinet 7 for this purpose.

Conversely, a transmitter started by this remote command and another transmitting antenna 22 can be provided, as shown in FIGS. 6 and 7, for transmitting information to the aircraft.

It is also possible to provide, on the top of the device, intermittent flash 23 operating continuously or started by remote control at long range, and enabling a first distant approach phase, in order to command the starting up of the system of beams and lamps, particularly infrared ones, only in the second approach phase in order to limit consumption and to restrict spotting for military applications, this flash 23 itself also being able to operate using visible or infrared light.

What is claimed is:

1. An optical guidance system for the landing of an aircraft on a landing area along a predetermined approach path, comprising:

elevation reference means for indicating elevation along the approach path, elevation reference means further comprising upward and downward elevation overshoot indicating means for indicating overshoot of the approach path, having directed luminous beams adjusted so that said luminous beams can only be seen respectively in the case of an upward overshoot and a downward overshoot of the approach path in the elevation of the aircraft, said elevation overshoot indicating means being distinguished from each other by their quantity;

two horizon reference bars each having a luminous zone, disposed on either side of the elevation reference means and in alignment with each other in a horizontal direction substantially perpendicular to the approach path, said luminous zones enabling the identification of the elevation reference means; and two azimuth overshoot indicating lights, respectively located at each outer end of the horizon reference bars, and provided with masks in such a way that said azimuth overshoot indicating lights can only be seen by the aircraft when the aircraft overshoots the approach path in azimuth to the left or to the right.

2. An optical guidance system as claimed in claim 1, wherein the luminous zones and the azimuth overshoot indicating lights emit visible light.

3. An optical guidance system as claimed in claim 1, wherein the luminous zones and the azimuth overshoot indicating lights emit infrared light.

4. An optical guidance system as claimed in claim 1, further comprising:

a transmitter; and a transmitting antenna enabling encoded information to be transmitted to the aircraft.

5. An optical guidance system for the landing of an aircraft on a landing area along a predetermined approach path, comprising:

elevation reference means for indicating elevation along the approach path;

two horizon reference bars, each having a luminous zone, disposed on either side of the elevation reference means and in alignment with each other in a horizontal direction substantially perpendicular to the approach path, said luminous zones enabling the identification of the elevation reference means; and two azimuth overshoot indicating lights, respectively located at each outer end of the horizon reference bars, and provided with masks in such a way that said azimuth overshoot indicating lights can only be seen by the aircraft when the aircraft overshoots the approach path in azimuth to the left or to the right; wherein the elevation reference means comprises:

upward and downward elevation overshoot indicating means for indicating overshoot of the approach path, having directed luminous beams adjusted so that said luminous beams can only be seen respectively in the case of an upward overshoot and a downward overshoot of the approach path in the elevation of the aircraft, said elevation overshoot indicating means being distinguished from each other by their position with respect to the luminous zones of the horizon reference bars and by their quantity.

6. An optical guidance system for the landing of an aircraft on a landing area along a predetermined approach path, comprising:

elevation reference means for indicating elevation along the approach path;

two horizon reference bars, each having a luminous zone, disposed on either side of the elevation reference means and in alignment with each other in a horizontal direction substantially perpendicular to the approach path, said luminous zones enabling the identification of the elevation reference means; and two azimuth overshoot indicating lights, respectively located at each outer end of the horizon reference bars, and provided with masks in such a way that said azimuth overshoot indicating lights can only be seen by the aircraft when the aircraft overshoots the approach path in azimuth to the left or to the right; wherein the elevation reference means comprises:

upward and downward elevation overshoot indicating means for indicating overshoot of the approach path, having directed luminous beams adjusted so that said luminous beams can only be seen respectively in the case of an upward overshoot and a downward overshoot of the approach path in the elevation of the aircraft, said elevation overshoot indicating means being distinguished from each other by their quantity.

* * * * *